(12) United States Patent
Longatte et al.

(10) Patent No.: US 11,208,016 B2
(45) Date of Patent: Dec. 28, 2021

(54) VENTILATION DEVICE FOR VEHICLE SEAT

(71) Applicant: FAURECIA Sièges d'Automobile, Nanterre (FR)

(72) Inventors: Florent Longatte, Rambouillet (FR); Jacques Robert, Marcoussis (FR); Anthony Maire, Montbeliard (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 85 days.

(21) Appl. No.: 16/720,132

(22) Filed: Dec. 19, 2019

(65) Prior Publication Data

US 2020/0198506 A1    Jun. 25, 2020

(30) Foreign Application Priority Data

Dec. 20, 2018    (FR) ..................... 18 73468

(51) Int. Cl.
*A47C 7/74* (2006.01)
*B60N 2/56* (2006.01)
*B60N 2/70* (2006.01)

(52) U.S. Cl.
CPC ......... *B60N 2/5628* (2013.01); *B60N 2/5657* (2013.01)

(58) Field of Classification Search
CPC .. B60N 2/5657; B60N 2/5671; B60N 2/5628; B60N 2/879; B60N 2/885; B60N 2/5635; B60N 2/565; B60H 1/00285; A47C 7/74; A47C 7/40; B64D 11/0642
See application file for complete search history.

(56) References Cited

U.S. PATENT DOCUMENTS

| | | | | |
|---|---|---|---|---|
| 6,644,735 | B2 * | 11/2003 | Bargheer | B60N 2/5671 297/180.13 |
| 7,621,594 | B2 * | 11/2009 | Hartmann | B60H 1/00821 219/217 |
| 7,708,626 | B2 * | 5/2010 | Bargheer | B60N 2/5685 454/120 |
| 7,784,863 | B2 * | 8/2010 | Fallen | B60N 2/58 297/180.14 |
| 9,346,384 | B2 * | 5/2016 | Zhang | B60N 2/56 |
| 9,975,394 | B2 * | 5/2018 | Fitzpatrick | B60N 2/5671 |
| 10,029,797 | B2 * | 7/2018 | Space | B60N 2/5657 |
| 10,518,681 | B2 * | 12/2019 | Marquette | B60N 2/5671 |
| 10,543,761 | B2 * | 1/2020 | Seiting | B60N 2/5671 |
| 10,981,475 | B2 * | 4/2021 | Hotta | B60H 1/00285 |
| 2002/0041116 | A1 * | 4/2002 | Bogisch | B60N 2/5635 297/180.1 |

(Continued)

FOREIGN PATENT DOCUMENTS

EP    2607155 A1    6/2013
JP    2018093921    6/2018

(Continued)

*Primary Examiner* — Shin H Kim
(74) *Attorney, Agent, or Firm* — Barnes & Thornburg LLP

(57) ABSTRACT

A device for ventilating the occupant of a vehicle seat, comprising an air inlet receiving air from a ventilation member, and comprising a first duct integrated at least in part into the backrest of the seat, a second duct integrated into a headrest mounted on the seat and supplying at least one air outlet integrated into the headrest and expelling air coming from the ventilation member, the second duct and first duct being connected by a leaktight sliding connection.

20 Claims, 9 Drawing Sheets

(56) References Cited

U.S. PATENT DOCUMENTS

| | | | |
|---|---|---|---|
| 2002/0057006 A1* | 5/2002 | Bargheer | B60N 2/5635 297/180.14 |
| 2006/0175877 A1* | 8/2006 | Alionte | B60N 2/5635 297/180.14 |
| 2006/0273646 A1* | 12/2006 | Comiskey | B60N 2/5628 297/408 |
| 2008/0122275 A1* | 5/2008 | Flory | B60N 2/5635 297/230.1 |
| 2008/0315634 A1* | 12/2008 | Hartmann | B60N 2/5635 297/180.14 |
| 2011/0115263 A1* | 5/2011 | Bargheer | B60N 2/5621 297/180.13 |
| 2011/0187165 A1* | 8/2011 | Oota | B60N 2/5657 297/180.14 |
| 2013/0165033 A1* | 6/2013 | Fitzpatrick | B60N 2/5692 454/120 |
| 2016/0250956 A1 | 9/2016 | Todd | |
| 2018/0009349 A1* | 1/2018 | Kim | B60N 2/5678 |
| 2018/0160816 A1 | 6/2018 | Fumitoshi | |
| 2019/0092197 A1* | 3/2019 | Arata | B60N 2/565 |
| 2019/0160417 A1* | 5/2019 | Matsumoto | B60H 1/034 |
| 2019/0351735 A1* | 11/2019 | Kawano | B60H 1/00285 |
| 2019/0359106 A1* | 11/2019 | Suzuki | B60N 2/885 |
| 2020/0198506 A1* | 6/2020 | Longatte | B60N 2/5671 |
| 2020/0238873 A1* | 7/2020 | Akaike | B60N 2/5657 |

FOREIGN PATENT DOCUMENTS

| | | |
|---|---|---|
| KR | 20160104875 | 9/2016 |
| KR | 20160104877 | 9/2016 |

* cited by examiner

VENTILATION DEVICE FOR VEHICLE SEAT

PRIORITY CLAIM

This application claims priority French Application No. FR 18 73468, filed Dec. 20, 2018, which is expressly incorporated by reference herein.

BACKGROUND

The present disclosure relates to a ventilation device for a vehicle seat. The present disclosure also relates to the field of comfort for the occupants, whether passengers or drivers, of vehicles such as motor vehicles, buses, or the like, and more particularly to the field of hot or cold ventilation of these occupants.

SUMMARY

According to the present disclosure, a vehicle seat includes a seat back and a ventilation device. The ventilation device is integrated into a headrest included in the seat back.

In illustrative embodiments, a device for ventilating the occupant of a vehicle seat, which comprises an air inlet receiving air from a ventilation member, comprises a first duct integrated at least in part into the backrest of the seat, and comprises a second duct integrated into a headrest mounted on the seat and supplying at least one air outlet integrated into the headrest and expelling air coming from the ventilation member, for which the second duct and the first duct are connected directly or indirectly by a leaktight sliding connection.

In illustrative embodiments, this connection, which may be made at a connection of the headrest and the seat, allows adjustment of the height of the headrest relative to the seat while maintaining the leaktight connection.

In illustrative embodiments, the headrest having lateral extensions configured to surround the sides of the occupant's head, the device of the present disclosure may comprise at least one air outlet at the distal end of the lateral extensions of the headrest.

In illustrative embodiments, the second duct is connected to the air outlets by a T-connection provided with branches terminated by the air outlets. As a result, the air outlets are in a forward position and distanced from the occupant's neck, which prevents air from being blown directly thereon and on the shoulders of the occupant.

In illustrative embodiments, the air outlets are preferably arranged in the lower portion of the headrest. The second duct then comprises a gooseneck segment between the sliding connection and the T-connection for supplying the air outlets.

In illustrative embodiments, the air outlets may be provided with baffle means adapted to direct the air towards the occupant's thighs. The baffle means may be connected to or integrated into the air outlets. This, possibly coupled with the forward position of the air outlets relative to the occupant's neck, provides increased ventilation comfort.

In illustrative embodiments, the air outlets are dimensioned and/or positioned and oriented so that the air they expel carries along the ambient air at the occupant's cheeks so as to ventilate the occupant's cheeks and/or neck indirectly relative to the airflow coming from the air outlets.

In illustrative embodiments, the air outlets are positioned so that the air they expel carries along the ambient air at the occupant's shoulders so as to ventilate the occupant's shoulders.

In illustrative embodiments, the sliding connection may comprise an outer tube which ends the first duct and an inner tube which starts the second duct, a sealing material being arranged between the inner tube and the outer tube. The sealing material may in particular be an elastomeric foam seal.

In illustrative embodiments, the ventilation member may be integrated into the seat which may possibly further comprise an air heating and/or cooling device coupled to the ventilation member.

In illustrative embodiments, the seat may comprise a connection of the first duct to an air conditioning system of the vehicle.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
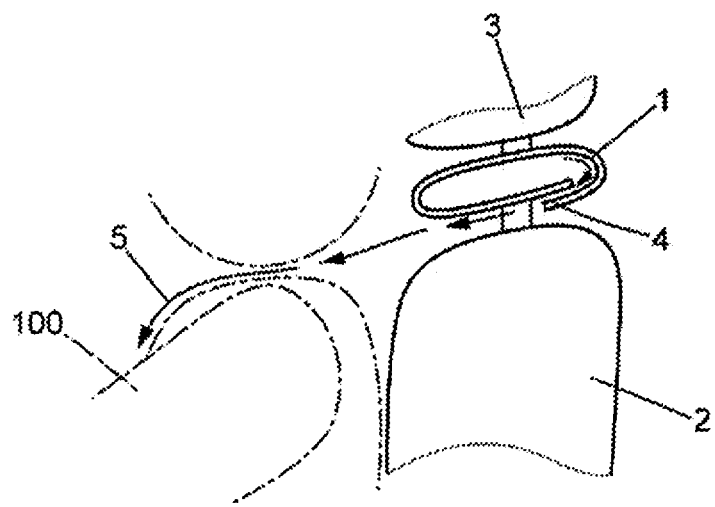
FIG. 1 shows a ventilation device of the prior art in a side sectional view.

FIG. 1 shows the device that comprises a tube 1 having air outlets 4 at its distal ends. The tube is arranged horizontally between the backrest 2 of the seat and the headrest 3. The airflow from the air outlets comes from behind the occupant 100 of the seat, runs along the top of the shoulders and spreads along the neck towards the chest.

The horizontal tube limits the downward movement of the headrest. In addition, the position of the air outlets behind the occupant is not desirable, because part of the airflow 5 flows directly along the neck and shoulders of the occupant which may be unpleasant.

Figure 2:
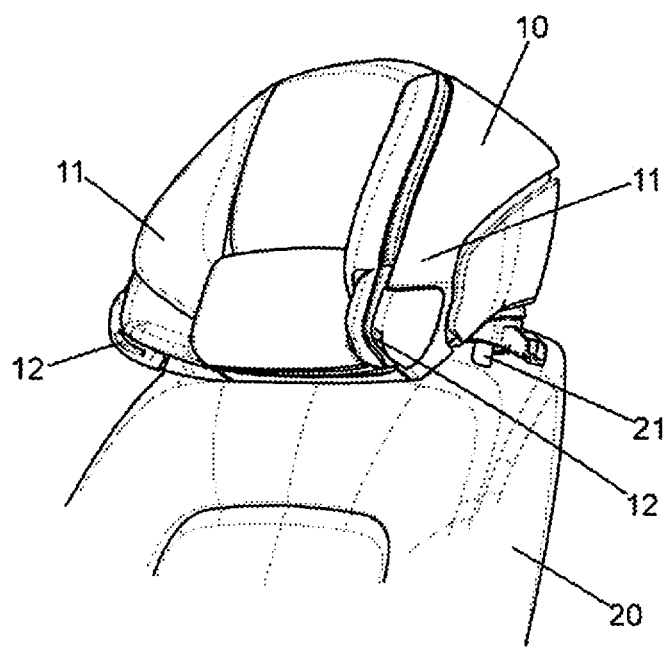
FIG. 2 shows a headrest equipped with air outlets of a device according to the present disclosure, in a side perspective.
Figure 3:
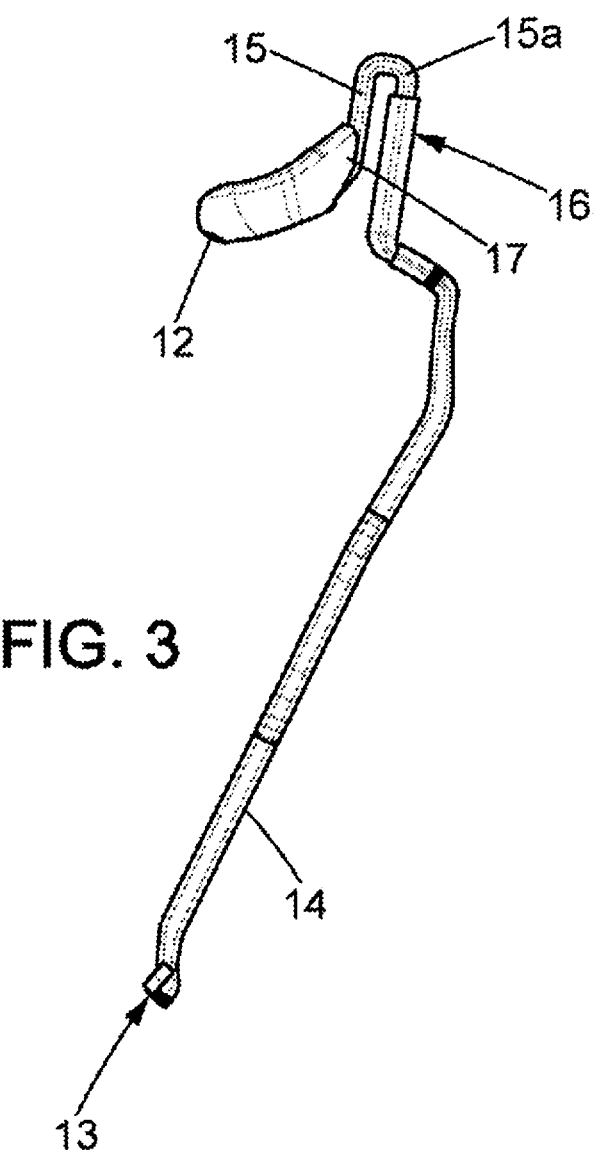
FIG. 3 shows a device according to the present disclosure in a side view.

FIG. 2 shows a sound bubble type of headrest 10, in other words, a wraparound headrest provided with lateral extensions 11 surrounding the ears and cheeks of the occupants to create a noise reduction zone for the occupant of the seat 20 on which it is mounted. In the context of the present disclosure, this headrest is equipped with two air outlets 12 of the device of the present disclosure, of which an example is shown in FIG. 3. The headrest further comprises fastening means 21 inserting into the seat 20, the headrest being mounted so as to slide in a vertical direction on the seat.

Figure 4:
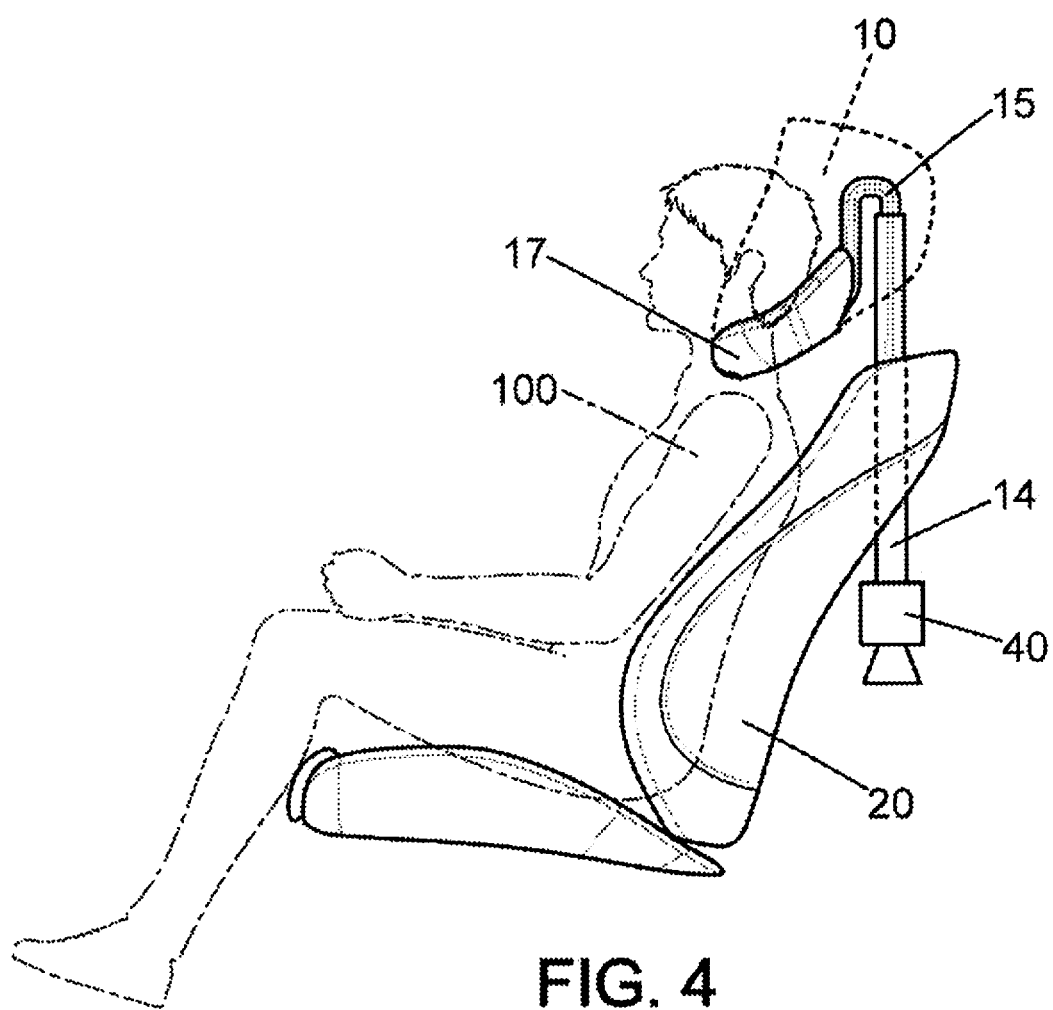
FIG. 4 shows the device of FIG. 3 in position on a vehicle seat in a side view.

According to FIG. 3, the device comprises an air inlet 13, receiving air from a ventilation member 40 shown in FIG. 4. The air inlet is the start of a first duct 14, which as we will see below is integrated into the backrest of the seat 20. To serve the air outlet(s) 12 and expel air coming from the ventilation member, a second duct 15 is integrated into the headrest 10 mounted on the seat 20. According to an important aspect of the present disclosure, to allow the supplying air to the air outlet from the air inlet at several height adjustment positions of the headrest 10 relative to the seat 20, the second duct 15 and the first duct 14 are connected by a leaktight sliding connection 16 of a length adapted to allow supplying air to the air outlet from the air inlet and to allow vertical movement of the headrest relative to the seat.

Figure 11:
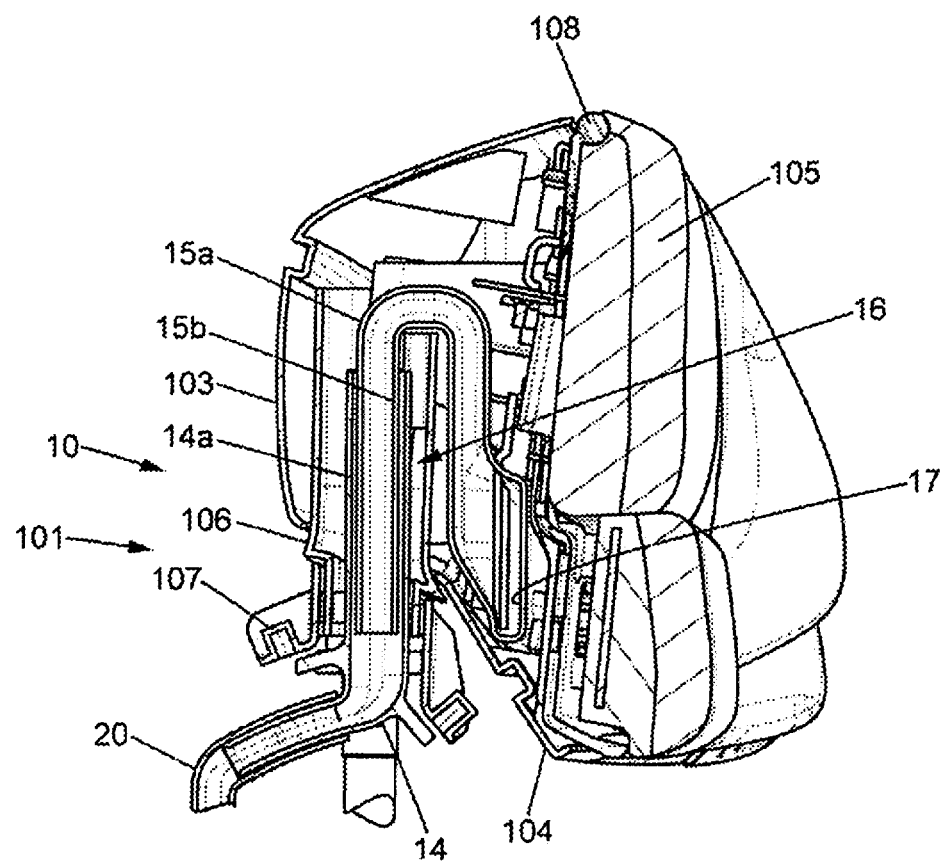
FIG. 11 shows a sectional perspective view of a headrest and seat equipped with a device according to the present disclosure.

According to the example shown in FIG. 11, the sliding connection 16 comprises an outer tube 14a which ends the first duct 14 and an inner tube 15b which starts the second duct 15 and which fits into the outer tube ending the first duct. An embodiment in which the inner and outer tubes are reversed or a mounting in which the tubes are connected through an intermediate tube (indirect connection) remain within the scope of the present disclosure.

To minimize air leakage, a sealing material such as an elastomeric foam seal is arranged between the inner tube and the outer tube.

This sliding connection 16 is located either in the headrest in the case where the first duct 14 climbs into the headrest, or in the seat if, on the contrary, it is the second duct 15 which descends into the seat.

Furthermore, to allow the second duct 15 to supply the air outlets in the lower part of the headrest, this duct is provided with a gooseneck shape 15a which offers a significant length of travel for the sliding connection 16.

Figure 9:
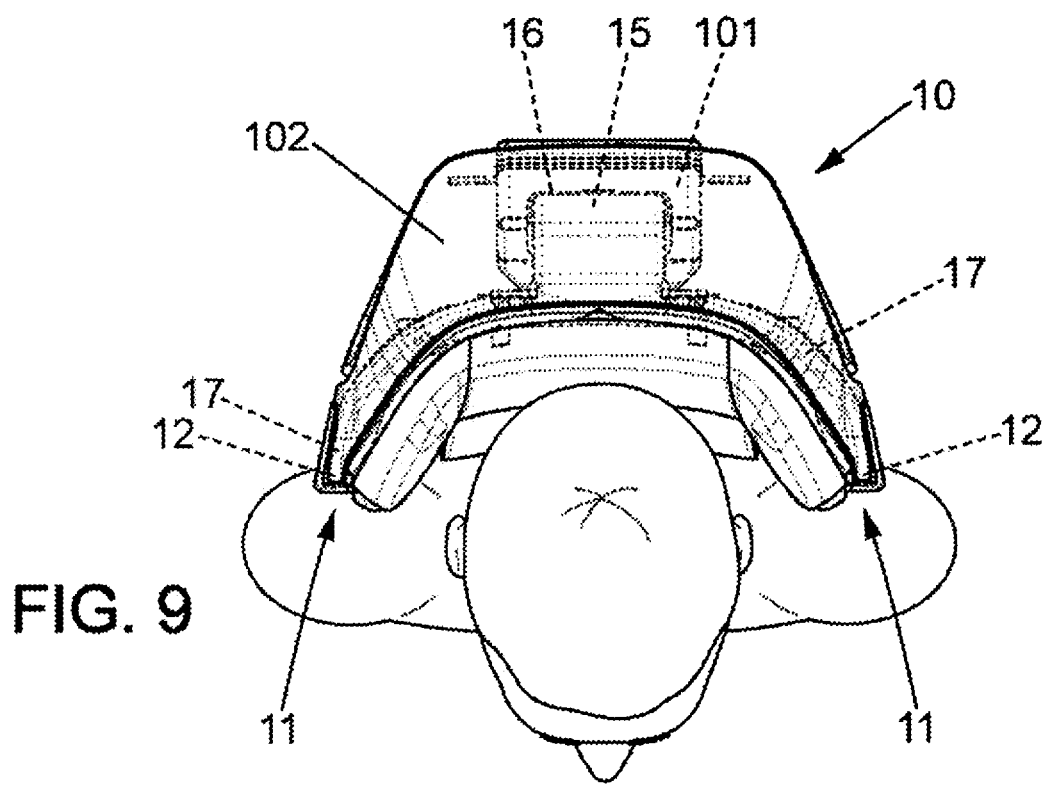
FIG. 9 shows the headrest and seat of FIG. 8 in a plan view.

In order to have the air outlets 12 at the distal ends of the lateral extensions 11 of the headrest which surround the sides of the occupant's head, the second duct 15 is connected to the air outlets 12 by a T-connection with two branches 17 following the curvature of the lateral extensions 11 as shown in FIG. 9.

Figure 8:
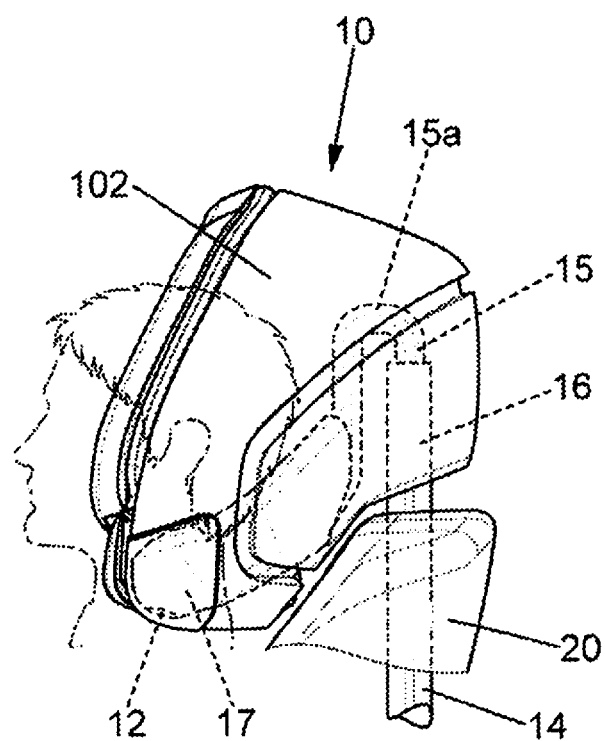
FIG. 8 shows a side view of a headrest and seat provided with a device according to the present disclosure.
Figure 10:
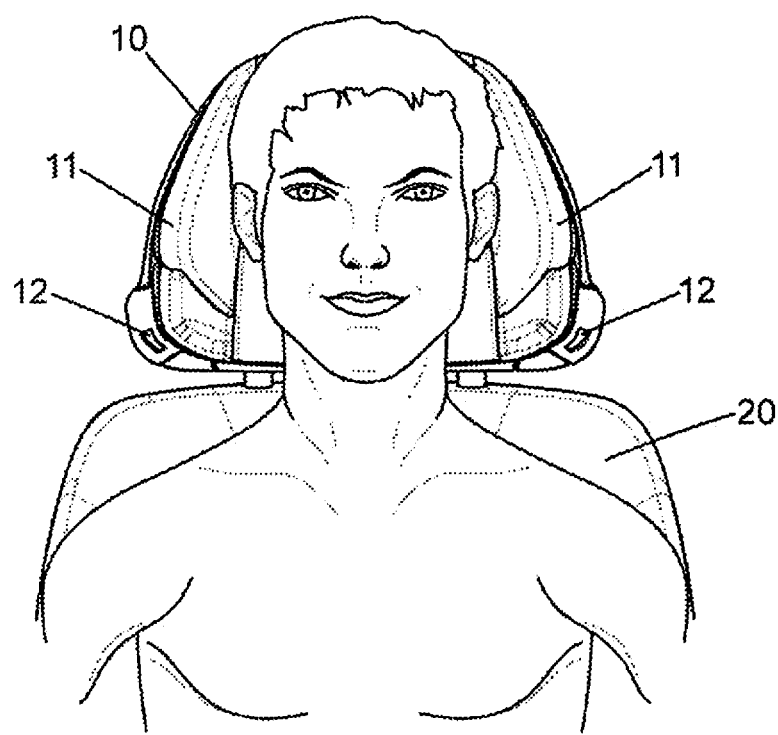
FIG. 10 shows the headrest and seat of FIG. 8 in a front view.

FIGS. 8, 9 and 10 show the positioning of the device relative to the seat 20 and headrest 10, respectively in side view, plan view, and front view.

According to the example of FIG. 8, the headrest 10 comprises a casing 102 around an inner frame on which is arranged the portion of the ventilation device consisting of the second duct 15, the T-connection with its branches 17, and air outlets 12.

FIG. 11, where the headrest is shown in section, gives an example embodiment in which the branches 17, the gooseneck segment 15a, and the second duct 15 are integrated into the headrest under a rear casing 103 and fixed to a frame 108 of the headrest. The first duct 14 extends beyond the seat 20 and climbs into the headrest to create the sliding connection 16 within the rear portion of the headrest. To hide the ducts, a flexible bellows 107 and a rear housing 106 are arranged around the lower portion of the duct 14 exiting the headrest. The flexible bellows can slide on the housing 106 when the height of the headrest is adjusted, or the headrest can slide vertically relative to the housing 106 to avoid revealing the duct 14 when the headrest is in the raised position. The bottom of the housing 106 and the bellows 107 form a foot portion 101 of the headrest intended to cover the duct or ducts. The headrest further comprises padding 105 and a lower shell 104 which, with the rear casing 103, encloses the back of the headrest.

FIG. 9 is a plan view that provides a better view of the T-connection with its branches 17. This figure also allows seeing the forward positioning of the air outlets 12 relative to the back of the seat's occupant.

FIG. 10 provides a view of the positioning of the air outlets 12 in the lateral extensions 11 of the headrest above the shoulders.

FIG. 4 is a general view of a device of the present disclosure comprising a first duct 14 in the seat, a second duct 15 in the headrest, and air outlets 12 above the shoulders of the seat's occupant and for which the first duct 14 is connected to a ventilation member 40, for example a fan integrated into the seat. In this case, the seat may further comprise an air heating and/or cooling device coupled to the ventilation member, or even a combined local heating/cooling fan of the seat.

Figure 7:
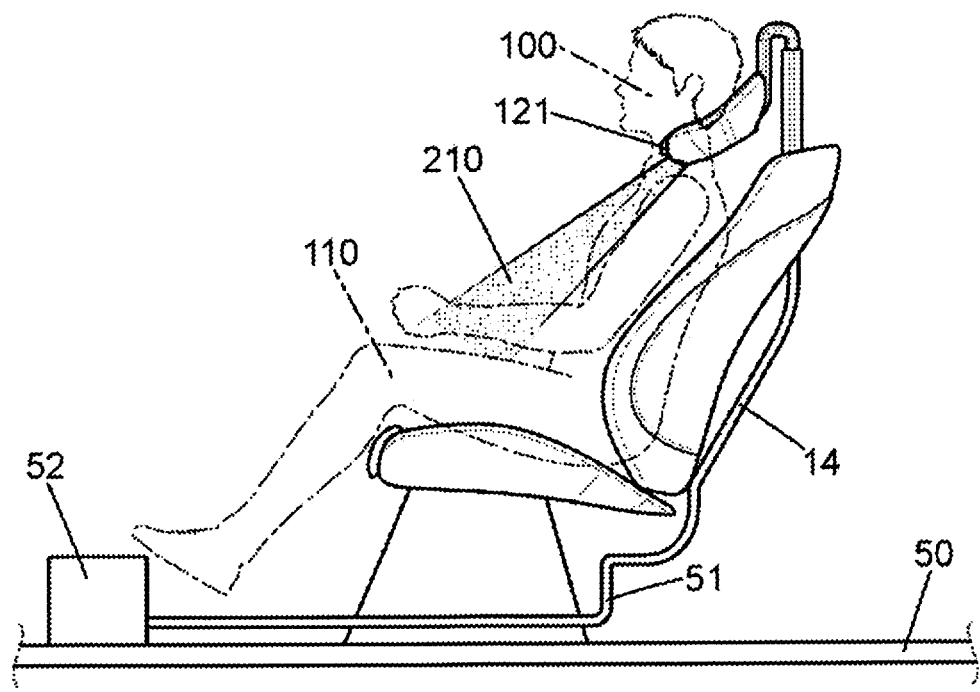
FIG. 7 shows the airflow exiting the device of FIG. 5 with baffle, in a side view.

However, this type of assembly can be replaced by a tube 51 connecting the first duct 14 to the air conditioning system 52 of a vehicle 50, as schematically represented in FIG. 7.

Figure 5:
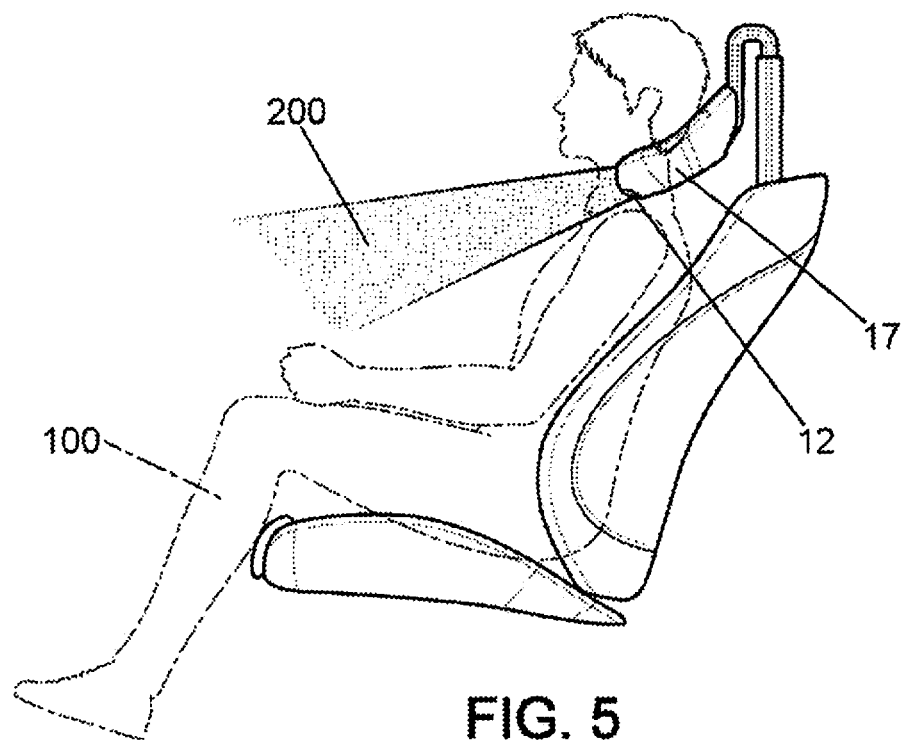
FIG. 5 shows the airflow exiting a device of FIG. 3 without baffle, in a side view.
Figure 6:
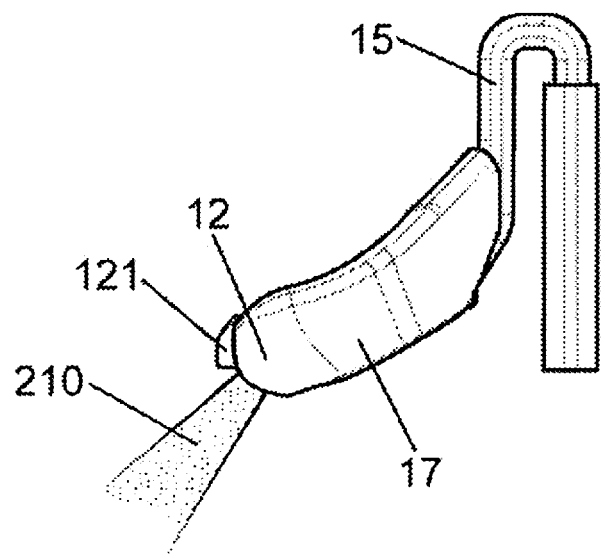
FIG. 6 shows a variant of the device of FIG. 3 with baffle, in a side view.

FIGS. 5, 6, and 7 further relate to the generation of the airflow exiting the air outlets 12. FIG. 5 shows a straight airflow 200 generated by straight air outlets. This airflow is directed mainly towards the hands of the seat's occupant, here the driver of a vehicle.

FIG. 6 shows the portion of the device integrated into the headrest. According to this preferred example, the air outlets 12 are equipped with baffle means 121 which direct the airflow 210 towards the occupant's thighs as shown in FIG. 7 without needing to benefit from a Coandă effect.

The one or more baffle means may be connected so as to optionally be movable or be integrated with the air outlets. In order to be able to adjust the direction of the airflow, the baffle 121 may optionally be movable in its inclination for example.

The present disclosure allows the ventilation to adequately cover the occupant, the airflow possibly also allowing indirect ventilation of the neck and cheeks of the occupant by carrying along the air around the air outlets.

The present disclosure is not limited to the exemplary embodiments described above solely as examples. In particular, the sliding connection may be located higher or lower in the headrest or seat, the sliding connection may comprise an intermediate sleeve between the ducts and possibly be supplemented by complementary parts offering greater displacement, for example such as accordion segments. The device may be applied to a seat of a light motor vehicle, a seat of a public transport vehicle, an airplane seat, or the like.

To provide local ventilation for the occupant of a seat, there may be ventilation devices with a fan in a headrest. Because of the limited space, such a fan is very weak and can only ventilate the back of the seat occupant's neck.

Some ventilation devices may be complex to implement, and can create areas of discomfort if the airflow is aimed incorrectly. In addition, some ventilation devices with ventilation in the seat and air outlets in the headrest do not allow adjusting the position of the headrest.

The invention claimed is:
1. A device for ventilating an occupant of a vehicle seat, the device comprising
    an air inlet receiving air from a ventilation member,
    a first duct integrated at least in part into a backrest of the seat, a second duct integrated into a headrest mounted on the seat and supplying at least one air outlet integrated into the headrest and expelling air coming from the ventilation member, wherein the second duct and the first duct are connected directly or indirectly by a leak tight sliding connection, and wherein said at least one air outlet is dimensioned and/or provided with a baffle configured to direct air towards the occupant's thighs.

2. The device of claim 1, wherein the headrest includes lateral extensions configured to surround sides of the occupant's head, the device comprising at least one air outlet at a distal end of each lateral extension of the headrest.

3. The device of claim 2, wherein the second duct is connected to the air outlets by a T-connection provided with branches terminated by the air outlets.

4. The device of claim 3, wherein the air outlets are arranged in a lower portion of the headrest, the second duct comprises a gooseneck segment between the sliding connection and the T-connection provided with branches terminated by the air outlets for supplying the air outlets.

5. The device of claim 2, wherein the air outlets are dimensioned and/or positioned and oriented so that the air they expel carries along ambient air at the occupant's cheeks so as to ventilate the occupant's cheeks and/or neck.

6. The device of claim 2, wherein the air outlets are positioned so that the air they expel carries along ambient air at the occupant's shoulders so as to ventilate the occupant's shoulders.

7. The device of claim 1, wherein the sliding connection comprises an outer tube which ends the first duct and an inner tube which starts the second duct, the inner tube fitting into the outer tube.

8. The device of claim 7, wherein an elastomeric foam seal is arranged between the inner tube and the outer tube.

9. A seat comprising
a headrest and
a device for ventilating an occupant of a vehicle seat,
wherein the device comprises an air inlet receiving air from a ventilation member, a first duct integrated at least in part into a backrest of the seat, a second duct integrated into the headrest mounted on the seat and supplying at least one air outlet integrated into the headrest and expelling air coming from the ventilation member, the second duct and the first duct being connected directly or indirectly by a leak tight sliding connection, and
wherein said at least one air outlet is dimensioned and/or provided with a baffle configured to direct air towards the occupant's thighs.

10. The seat of claim 9, wherein the headrest includes lateral extensions configured to surround sides of the occupant's head, the device comprising at least one air outlet at the distal end of each lateral extension of the headrest.

11. The seat of claim 10, wherein the second duct is connected to the air outlets by a T-connection provided with branches terminated by the air outlets.

12. The seat of claim 11, wherein the air outlets are arranged in a lower portion of the headrest, the second duct comprises a gooseneck segment between the sliding connection and the T-connection provided with branches terminated by the air outlets for supplying the air outlets.

13. The seat of claim 10, wherein the air outlets are dimensioned and/or positioned and oriented so that the air they expel carries along ambient air at the occupant's cheeks so as to ventilate the occupant's cheeks and/or neck.

14. The seat of claim 10, wherein the air outlets are positioned so that the air they expel carries along ambient air at the occupant's shoulders so as to ventilate the occupant's shoulders.

15. The seat of claim 9, wherein the sliding connection comprises an outer tube which ends the first duct and an inner tube which starts the second duct, the inner tube fitting into the outer tube.

16. The seat of claim 15, wherein a sealing material is arranged between the inner tube and the outer tube.

17. The seat of claim 9, wherein the ventilation member is integrated into the seat.

18. The seat of claim 9, wherein the seat comprises a connection of the first duct to an air conditioning system of the vehicle.

19. A device for ventilating an occupant of a vehicle seat, the device comprising
an air inlet receiving air from a ventilation member,
a first duct integrated at least in part into a backrest of the seat,
a second duct integrated into a headrest mounted on the seat and supplying at least one air outlet integrated into the headrest and expelling air coming from the ventilation member,
wherein the second duct and the first duct are connected directly or indirectly by a leak tight sliding connection,
wherein the sliding connection comprises an outer tube which ends the first duct and an inner tube which starts the second duct, the inner tube fitting into the outer tube, and
wherein a sealing material is arranged between the inner tube and the outer tube.

20. The device of claim 19, wherein the sealing material is an elastomeric foam seal.

* * * * *